United States Patent
Pan et al.

(10) Patent No.: US 11,341,841 B1
(45) Date of Patent: May 24, 2022

(54) METHOD AND DEVICE USED FOR REMOTE CONTROL BY OPTICAL FIBER SIGNALS AND POWER OVER ETHERNET

(71) Applicant: ANTAIRA TECHNOLOGIES, LLC, Brea, CA (US)

(72) Inventors: Woody Pan, New Taipei (TW); Zhi Huei Shao, New Taipei (TW)

(73) Assignee: ANTAIRA TECHNOLOGIES, LLC, Brea, CA (US)

( * ) Notice: Subject to any disclaimer, the term of this patent is extended or adjusted under 35 U.S.C. 154(b) by 0 days.

(21) Appl. No.: 17/306,366

(22) Filed: May 3, 2021

(51) Int. Cl.
| | | |
|---|---|---|
| *H04B 10/07* | (2013.01) | |
| *G08C 23/06* | (2006.01) | |
| *H04L 12/10* | (2006.01) | |
| *H04L 49/351* | (2022.01) | |
| *H04B 10/25* | (2013.01) | |
| *H04B 10/80* | (2013.01) | |

(52) U.S. Cl.
CPC ............. *G08C 23/06* (2013.01); *H04B 10/25* (2013.01); *H04L 12/10* (2013.01); *H04L 49/351* (2013.01); *H04B 10/07* (2013.01); *H04B 10/806* (2013.01)

(58) Field of Classification Search
CPC ........ G08C 23/06; H04B 10/25; H04B 10/07; H04B 10/806; H04L 12/10; H04L 49/351
USPC ........................................ 398/1–38, 140–172
See application file for complete search history.

(56) References Cited

U.S. PATENT DOCUMENTS

| | | | | |
|---|---|---|---|---|
| 11,012,248 B1* | 5/2021 | Chen | ........................ | H04L 12/10 |
| 11,165,595 B2* | 11/2021 | Malicoat | .................. | H04L 12/10 |
| 2006/0063509 A1* | 3/2006 | Pincu | ....................... | H04L 12/10 455/402 |
| 2006/0133368 A1* | 6/2006 | Tolliver | ................... | H04L 12/44 370/389 |
| 2007/0170909 A1* | 7/2007 | Vorenkamp | ............. | H04L 12/10 324/76.11 |
| 2007/0208961 A1* | 9/2007 | Ghoshal | ................... | G06F 1/189 713/300 |
| 2007/0260904 A1* | 11/2007 | Camagna | ............ | H04L 41/0681 713/310 |
| 2008/0114997 A1* | 5/2008 | Chin | ........................ | H04L 12/10 713/321 |
| 2009/0243391 A1* | 10/2009 | Susong, III | ............... | H02J 1/06 307/66 |
| 2010/0005322 A1* | 1/2010 | Diab | ................. | H04L 12/40045 713/300 |

(Continued)

*Primary Examiner* — Dibson J Sanchez
(74) *Attorney, Agent, or Firm* — Tracy M Helms; Apex Juris, Pllc.

(57) ABSTRACT

A method and a device used for remote control by optical fiber signals and power over Ethernet includes a power sourcing equipment (PSE) outputting a direct current (DC) via at least one network cable to at least one powered device (PD). When the PSE receives a second restarting signal from a signal controller, the PSE stops supplying power to the at least one PD. An optoelectric signal converter converts an optical signal from an Ethernet Switch to a digital signal for the signal controller. When the optical signal is determined by the signal controller to be interrupted after a first time duration passes, the signal controller outputs the second restarting signal to the PSE for restarting. After restarting, the PSE re-powers the at least one PD. The at least one PD is restarted remotely without requiring working personnel at the location of the at least one PD, improving restarting efficiency.

8 Claims, 3 Drawing Sheets

(56) References Cited

U.S. PATENT DOCUMENTS

| | | | | |
|---|---|---|---|---|
| 2010/0007334 A1* | 1/2010 | Apfel | .................. | H04L 12/10 |
| | | | | 324/123 R |
| 2010/0217965 A1* | 8/2010 | Wolff | .................. | H04L 12/10 |
| | | | | 713/2 |
| 2011/0241425 A1* | 10/2011 | Hunter, Jr | ......... | H04L 12/40045 |
| | | | | 307/39 |
| 2014/0129853 A1* | 5/2014 | Diab | .................. | H04L 12/413 |
| | | | | 713/310 |
| 2014/0314412 A1* | 10/2014 | Soto | .................. | H04B 10/808 |
| | | | | 398/67 |
| 2015/0244535 A1* | 8/2015 | Chen | ................ | H04Q 11/0067 |
| | | | | 713/300 |

* cited by examiner

METHOD AND DEVICE USED FOR REMOTE CONTROL BY OPTICAL FIBER SIGNALS AND POWER OVER ETHERNET

BACKGROUND OF THE INVENTION

1. Field of the Invention

A method and a device used for remote control, more particularly a method and a device used for remote control by optical fiber signals and Power over Ethernet.

2. Description of the Related Art

Nowadays, an Ethernet Switch commonly has a Power over Ethernet (PoE) function. The PoE function is an important technology for supplying electric power over an Ethernet cable, and is mainly used for places where an Ethernet cable is present but without a power supply in proximity. The PoE function is endowed with a plug-and-play function, conveniently and cost-effectively satisfying a user's need of finding a power source.

The PoE function is mainly to supply a direct current (DC) from a power sourcing equipment (PSE) through the Ethernet cable to a powered device (PD), and as the PD receives the DC incoming from the PSE, the PD and the PSE undergo a series of handshaking to ensure the PoE function is working normally. The PSE usually is a set of circuits integrated in the Ethernet Switch, or an external device integrated with the Ethernet Switch. The PD also usually is a device connected to an Ethernet network such as a security IP camera, a Femtocell, a VoIP phone, a signage/display, a lighting, medical equipment, vehicle infotainment, point of sales, or sensors of a Radio Frequency Identification (RFID) system.

According to IEEE 802.3, a standard wired network is defined to be within 100 meters regardless of the types of technologies involved. Therefore, when power supplying requires the PoE function to supply power over 100 meters to reach a remote internet equipment, a media converter is at disposal for aiding the PoE function to supply power. The media converter converts data between an Ethernet network data and an optical fiber signal. A user is therefore able to set up a media converter with the PoE function near a remote network equipment for connecting with the remote network equipment, and a local Ethernet Switch connects with the remote network equipment via long-range optical fibers using optical communication means. This way the local Ethernet Switch both transmits data and supplies power to the remote network equipment through the media converter with the PoE function, satisfying both needs of supplying power and transferring data. On the other hand, an ordinary Ethernet Switch or other network equipment can also be equipped with a media converter with the PoE function, satisfying needs of the remote network equipment for power supplying and data transfers.

There is however a drawback with the PoE function. When a restart is required for the remote network equipment due to any reasons, the restart requires working personnel to arrive at a location of the remote network equipment for repairs and maintenance. This is a drawback and a burden for the working personnel since the location of the remote network equipment might be hard to reach, for instance, if a surveillance camera is the remote network equipment, the surveillance camera might be located at an edge of a building, causing great inconvenience and serious safety concerns for the working personnel.

The remote network equipment nowadays is more frequently powered by the PoE function. A solution is therefore much needed to spare the working personnel from repairs and maintenance at the location of the remote network equipment.

SUMMARY OF THE INVENTION

To overcome such and other drawbacks, the present invention provides a method and a device used for remote control by optical fiber signals and Power over Ethernet. The present invention restarts a remote network equipment from an Ethernet Switch via a media converter. The media converter is remotely located and has a PoE function. The present invention eliminates the drawback of requiring working personnel to arrive at a location of the remote network equipment for repairs and maintenance. More particularly, the device used for remote control by optical fiber signals and Power over Ethernet includes a power sourcing equipment (PSE), a network packet switching controller, an optoelectric signal converter, a signal controller, multiple isolating coil sets, multiple connectors, and a configuration switch.

The PSE outputs a direct current (DC) through at least one network cable to at least one powered device (PD). When the PSE receives a second restarting signal, the PSE restarts and stops supplying power to the at least one PD.

The network packet switching controller transfers and receives a network packet through the at least one network cable to the at least one PD. When the network packet switching controller receives a first restarting signal, the network packet switching controller restarts.

The optoelectric signal converter receives an optical signal through an optical fiber, converts the optical signal into a digital signal, and outputs the digital signal.

The signal controller electrically connects to the PSE and outputs the second restarting signal to the PSE. The signal controller is electrically connecting the network packet switching controller, and outputs the first restarting signal to the network packet switching controller. The signal controller is also electrically connecting the optoelectric signal converter, and determines whether the optical signal is interrupted according to the digital signal converted and entered into the signal controller by the optoelectric signal converter.

When the signal controller determines that the optical signal has been interrupted for a first time duration, the signal controller outputs the first restarting signal and the second restarting signal for restarting both the network packet switching controller and the PSE, and for stopping the PSE from supplying power to the at least one PD. After restarting, the signal controller resumes power supplying to the at least one PD.

Each of the isolating coil sets has a first side and a second side. The first side of each of the isolating coil sets is electrically connected to a specifically corresponding outputting differential signaling port among the multiple outputting differential signaling ports and a specifically corresponding inputting differential signaling port among the multiple inputting differential signaling ports.

Each of the connectors is electrically connected to a specifically corresponding outputting differential signaling port and a specifically corresponding inputting differential signaling port from the isolating coil sets on the second side.

The configuration switch electrically connects the signal controller and outputs multiple settings.

The optical fiber electrically connects the optoelectric signal converter and the optical fiber is connected to an Ethernet Switch. The Ethernet Switch outputs the optical signal to the optoelectric signal converter via the optical fiber. The Ethernet Switch has an optical fiber port, and when the optical fiber connects to the optical fiber port, the optoelectric signal converter receives the optical signal coming from the Ethernet Switch. When the optical fiber disconnects from the optical fiber port, the optical signal from the Ethernet Switch stops transferring to the optoelectric signal converter.

The first time duration is greater than 3 seconds.

The network packet switching controller further includes a port physical layer. The port physical layer further includes multiple outputting differential signaling ports and multiple inputting differential signaling ports.

The present invention is a method and a device used for remote control by optical fiber signals and power over Ethernet. The method used for remote control by optical fiber signals and power over Ethernet has a power sourcing equipment (PSE) supplying a direct current (DC) to a Powered Device (PD). An optoelectric converter receives an optical signal via an optical fiber. A signal controller outputs a second restarting signal to the PD and further outputs a first restarting signal to a network packet switching controller. The signal controller further determines whether the optical signal is interrupted from the digital signal converted by the optoelectric signal converter. The method used for remote control by optical fiber signals and Power over Ethernet further includes the following steps:

step S0: initializing the signal controller and a Power over Ethernet (PoE) function, and going to step S1;

step S1: determining whether a PD remote reset technology (PRRT) function in the signal controller is enabled; wherein if the PRRT is disabled, going to S2, and if the PRRT is enabled, going to step S3;

step S2: enabling the signal controller, and after a first time duration passes, further enabling the PoE function, going to step S1;

step S3: determining whether the optoelectric signal converter receives an optical signal from the Ethernet Switch via the optical fiber; wherein if the optoelectric signal converter has received the signal, going to S4, and if the optoelectric signal converter does not receive the signal, going to S5;

step S4: determining whether the optoelectric signal converter has continuously received the signal for a second time duration; wherein if the optoelectric signal converter has received the signal continuously for the second time duration, going to step S2, and when the optoelectric signal converter has received the signal only sporadically for the second time duration, going to step S8;

step S5: determining whether the optoelectric signal converter has continuously lost the signal for a third time duration; wherein if the optoelectric signal converter has lost the signal continuously for the third time duration, going to step S6, and if the optoelectric signal converter has lost the signal only sporadically for the third time duration, going to step S4;

step S6: enabling the signal controller, and after a fourth time duration passes, going to step S7;

step S7: determining whether the optoelectric signal converter continuously losing the signal; wherein if the optoelectric signal converter loses the signal continuously, going to step S5, and if the optoelectric signal converter loses the signal only sporadically, going to step S2;

step S8: turning the signal controller off and turning the PoE function off, and going to step S3.

The first time duration is greater than 5 seconds, the second time duration is greater than 3 seconds, the third time duration is greater than 10 seconds, and the fourth time duration is greater than 5 seconds.

In conclusion, the method and the device used for remote control by optical fiber signals and Power over Ethernet of the present invention has the PSE supplying the DC to the PD through the optical fiber and the Ethernet Switch. When the PD needs a restart, the optical fiber is unplugged and disconnected from the Ethernet Switch for 3 seconds and then re-plugged and connected back again for restarting the PD. The PD is the remote network equipment, and the device used for remote control by optical fiber signals and power over Ethernet of the present invention is the media converter with the PoE function. Therefore the Ethernet Switch restarts the remote network equipment locally via the media converter with the PoE function without requiring working personnel to arrive at the location of the remote network equipment, satisfying the objective of the present invention.

DETAILED DESCRIPTION OF THE INVENTION

Figure 1:
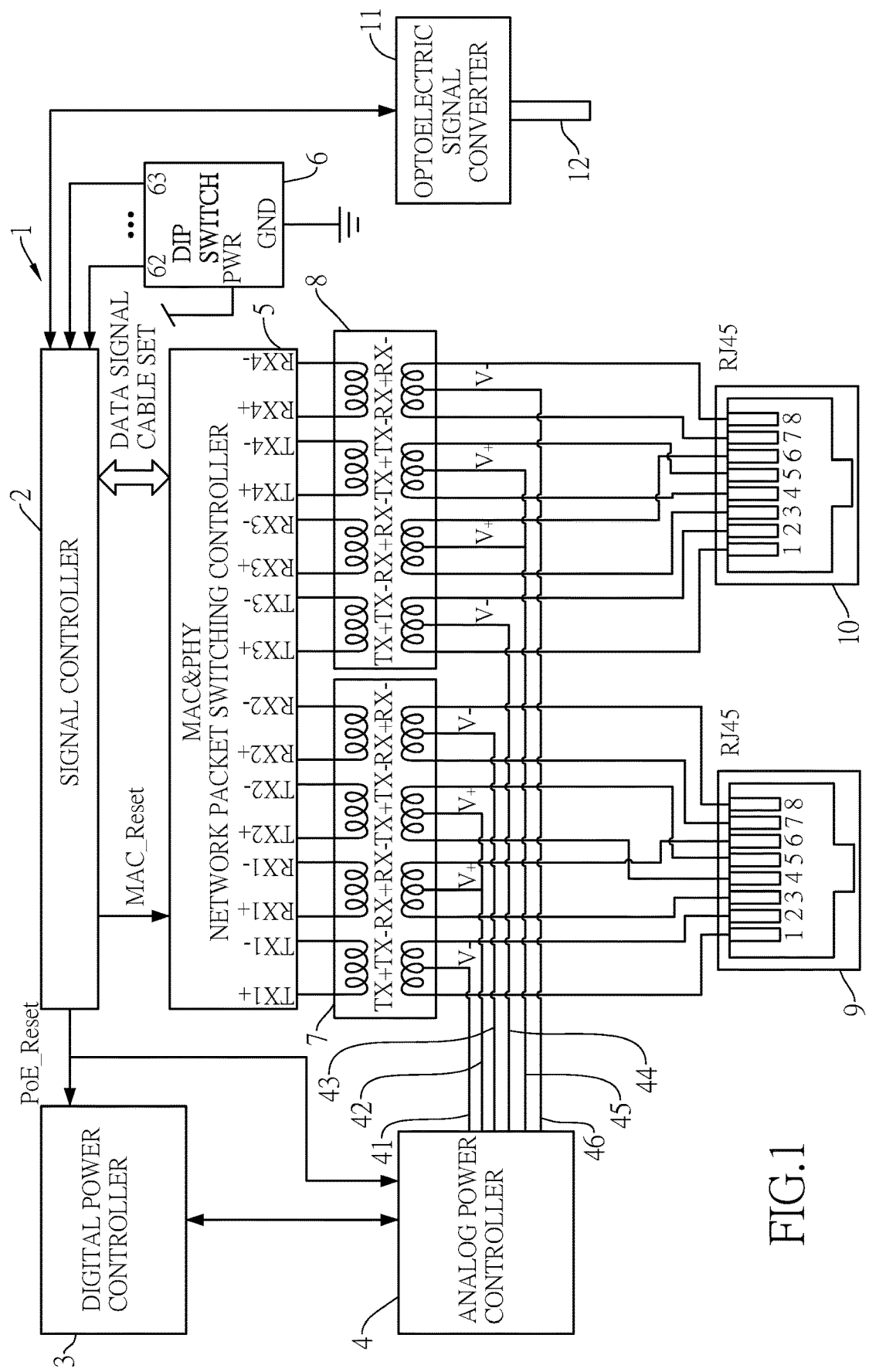
FIG. 1 is a block diagram of a device used for remote control by optical fiber signals and power over Ethernet of the present invention.
Figure 2:
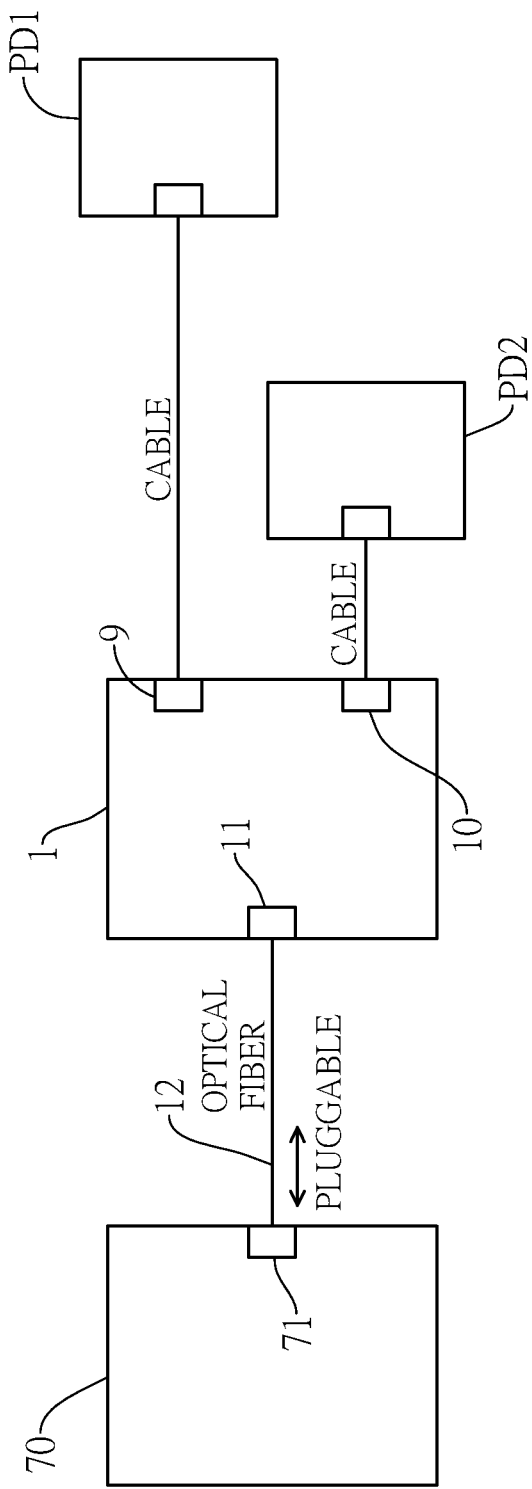
FIG. 2 is a perspective view of how the device used for remote control by optical fiber signals and power over Ethernet of the present invention connects with a surveillance camera and an Ethernet Switch.

With reference to FIGS. 1 and 2, in a first embodiment of the present invention, a device used for remote control by optical fiber signals and power over Ethernet 1 is essentially a media converter with a Power over Ethernet (PoE) function. The device 1 supplies power and transfers data through an Ethernet network to a powered device (PD), such as a surveillance camera. The device 1 includes a signal controller 2, a digital power controller 3, an analog power controller 4, a network packet switching controller 5, a configuration switch 6, a first set of isolating coil sets 7, a second set of isolating coil sets 8, a first connector 9, a second connector 10, an optoelectric signal converter 11, and an optical fiber 12. The digital power controller 3 and the analog power controller 4 are Power Sourcing Equipment (PSE). The first connector 9 and the second connector 10 each have 8 external connection points. The 8 external points are connected to 4 pairs of cables. The network packet switching controller 5 can transmit and receive multiple network packages. The network packet switching controller 5 includes a media access control (MAC) and a port physical layer (PHY).

The PHY has four pairs of outputting differential signaling ports and four pairs of inputting differential signaling ports. The four pairs of outputting differential signaling ports include: the first outputting differential signaling port pair (TX1+, TX1−), the second outputting differential signaling port pair (TX2+, TX2−), the third outputting differential signaling port pair (TX3+, TX3−), and the fourth outputting differential signaling port pair (TX4+, TX4−). The four pairs of inputting differential signaling ports include: the first inputting differential signaling port pair (RX1+, RX1−), the second inputting differential signaling port pair (RX2+, RX2−), the third inputting differential signaling port pair (RX3+, RX3−), and the fourth inputting differential signaling port pair (RX4+, RX4−). The first outputting differential signaling port pair and the second outputting differential signaling port pair are formed alternatingly to the first inputting differential signaling port pair and the second inputting differential signaling port pair. The first outputting differential signaling port pair and the second outputting differential signaling port pair are coupled and connected to the first connector 9 via the first set of the isolating coil sets 7, aligning the outputting differential signaling ports and the inputting differential signaling ports of the first connector 9 from left to right as: TX1+, TX1−, RX1+, TX2+, TX2−, RX1−, RX2+, and RX2−. The third outputting differential signaling port pair and the fourth outputting differential signaling port pair are coupled and connected to the second connector 10 via the second set of the isolating coil sets 8, aligning the outputting differential signaling ports and the inputting differential signaling ports of the second connector 10 from left to right as: TX3+, TX3−, RX3+, TX4+, TX4−, RX3−, RX4+, and RX4−. Both the first connector 9 and the second connector 10 are RJ45 connectors for an Ethernet network, and the first connector 9 and the second connector 10 each connect to other Ethernet network devices through an Ethernet cable such as a CAT5 cable.

The first set of the isolating coil sets 7 and the second set of the isolating coil sets 8 each have 4 coupling coils, and each of the coupling coils has a first side with a first side induction coil and a second side with a second side induction coil. The first side induction coil on the first side and the second side induction coil on the second side are coupled yet working independently. Each of the coupling coils bi-directionally transmits signals from the first and the second side induction coils to another set of the first and the second side induction coils. Simultaneously, each of the coupling coils transmits a direct current (DC) independently without short-circuiting any other induction coils.

The first side of each of the coupling coils is also the first side of each of the isolating coil sets, and the first side of each of the isolating coil sets is electrically connected to a specifically corresponding outputting differential signaling port among the outputting differential signaling ports and a specifically corresponding inputting differential signaling port among the inputting differential signaling ports. To be more specific, each of the outputting differential signaling ports (TX1+, TX1−), (TX2+, TX2−), (TX3+, TX3−), and (TX4+, TX4−) electrically connects to a corresponding (TX+, TX−) of the first side of one of the coupling coils, and each of the inputting differential signaling ports (RX1+, RX1−), (RX2+, RX2−), (RX3+, RX3−), and (RX4+, RX4−) electrically connects to a corresponding (RX+, RX−) of the first side of one of the coupling coils as detailed in FIG. 1.

The digital power controller 3 is electrically connected to the analog power controller 4, and the digital power controller 3 controls an outputting DC voltage source of the analog power controller 4. The analog power controller 4 is used for supplying the outputting DC voltage source to the aforementioned 8 ports of the first connector 9 and 8 ports of the second connector 10. The digital power controller 3 is mixed radix, and the digital power controller 3 is used for communicating with the analog power controller 4 and the signal controller 2. At the same time, the digital power controller 3 isolates a high voltage of the analog power controller 4 away from low voltage circuits in the present invention, protecting a low voltage circuit such as the signal controller 2 of the device 1.

The analog power controller 4 has 6 outputting voltage ports labeled as 41-46. The first outputting voltage port 41 and the third outputting voltage port 43 each output a DC low voltage V− correspondingly to the electrically connected two coupling coils (TX1+, TX1−) and (RX2+, RX2−) from the first set of the isolating coil sets 7. The fourth outputting voltage port 44 and the sixth outputting voltage port 46 each output a DC low voltage V− correspondingly to the electrically connected two coupling coils (TX3+, TX3−) and (RX4+, RX4−) from the second set of the isolating coil sets 8. The second outputting voltage port 42 outputs a DC high voltage V+ simultaneously and correspondingly to the electrically connected two coupling coils (RX1+, RX1−) and (TX2+, TX2−) from the first set of the isolating coil sets 7. The fifth outputting voltage port 45 outputs a DC high voltage V+ simultaneously and correspondingly to the electrically connected two coupling coils (RX3+, RX3−) and (TX4+, TX4−) from the second set of the isolating coil sets 8.

The digital power controller 3 further has an inter-integrated circuit ($I^2C$) interface. The $I^2C$ interface is electrically connected with the signal controller 2 for communications between the $I^2C$ interface and the signal controller 2. The signal controller 2 has a first reset output (MAC_Reset), and the signal controller 2 is electrically connected to the network packet switching controller 5 for resetting the network packet switching controller 5. The signal controller 2 has a second reset output (PoE_Reset), and the signal controller 2 is electrically connected to the digital power controller 3 and the analog power controller 4 for resetting the digital power controller 3 and the analog power controller 4. The signal controller 2 is electrically connected to the network packet switching controller 5 for communications between the two via a data signal cable set.

The configuration switch 6 includes a first signal output port 62, a second signal output port 63, a power port PWR, and a ground GND, the power port PWR is electrically connected to a digital power source, and the ground GND is electrically connected to a grounding voltage. The configuration switch 6 also includes two hand switches. One hand switch dictates whether the first signal output port 62 outputs the grounding voltage or a digital high voltage. The other hand switch similarly dictates whether the second signal output port 63 outputs the grounding voltage or the digital high voltage. The first signal output port 62 and the second signal output port 63 are both electrically connected to the signal controller 2.

When the first signal output port 62 outputs either the grounding voltage or the digital high voltage to the signal controller 2, a PD remote reset technology (PRRT) inside the signal controller 2 is respectively either enabled or disabled, and the PRRT controls whether a function of remote resetting is enabled or disabled.

The optoelectric signal converter 11 is electrically connected to the signal controller 2 via a data cable. The optoelectric signal converter 11 communicates with the signal controller 2 bi-directionally, and the optoelectric signal converter 11 connects to a network via an optical fiber 12 and an Ethernet Switch 70. A length of the optical fiber 12 can span from a few hundred meters to a few kilometers or more. The optoelectric signal converter 11 receives digital signals from the signal controller 2, and then the optoelectric signal converter 11 converts the digital signals into optical signals before outputting the optical signals to the Ethernet Switch 70 via the optical fiber 12. Similarly, the optoelectric signal converter 11 also receives the optical signals from the Ethernet Switch 70 via the optical fiber 12, then the optoelectric signal converter 11 converts the optical signals into digital signals before outputting the digital signals to the signal controller 2. The signal controller 2 determines whether the optical signal has been interrupted based on the digital signal converted from the optical signal mentioned above. The Ethernet Switch 70 has an optical fiber port 71, and the optical fiber port 71 allows the optical fiber 12 to be plugged and connected to the Ethernet Switch 70 or be unplugged and disconnected from the Ethernet Switch 70.

With reference to FIGS. 1 and 2, the first outputting voltage port 41 outputs the DC low voltage V− to a pair of cable corresponding to the first outputting differential signaling port pair (TX1+, TX1−), for supplying the DC low voltage V− to a first network surveillance camera (PD1) electrically connected to the first connector 9. The second outputting voltage port 42 and the third outputting voltage port 43 each respectively output DC voltages to corresponding cables of the differential signaling ports, providing the outputting DC voltage source for the first network surveillance camera (PD1) electrically connected to the first connector 9. Similarly, the fourth outputting voltage port 44, the fifth outputting voltage port 45, and the sixth outputting voltage port 46 each respectively output DC voltages to corresponding cables of the differential signaling ports, providing the outputting DC voltage source for a second network surveillance camera (PD2) electrically connected to the second connector 10. The first network surveillance camera (PD1) and the second network surveillance camera (PD2) are remote network equipment. The digital power controller 3 and the analog power controller 4 are the aforementioned PSE, and the first network surveillance camera (PD1) and the second network surveillance camera (PD2) connected to the first connector 9 and the second connector 10 respectively are the PD.

The present invention provides how the device used for remote control by optical fiber signals and power over Ethernet is connected with optical fibers for restoring the Ethernet network connection after a disconnection. The present invention resets the remote network equipment connected to the Ethernet network by restarting the supplying power for the Ethernet, without requiring working personnel to do repairs and maintenance at locations of the remote network equipment. The present invention further provides a remote control method for the device used for remote control by optical fiber signals and power over Ethernet.

With reference to FIG. 2, a relationship of how the device used for remote control by optical fiber signals and power over Ethernet 1 of the present invention is connected with the remote network equipment, such as the first network surveillance camera (PD1) and the second network surveillance camera (PD2), and the Ethernet Switch 70. By re-connecting the optical fiber 12 to the optical fiber port 71 after a disconnection, the remote network equipment can have its reset.

Figure 3:
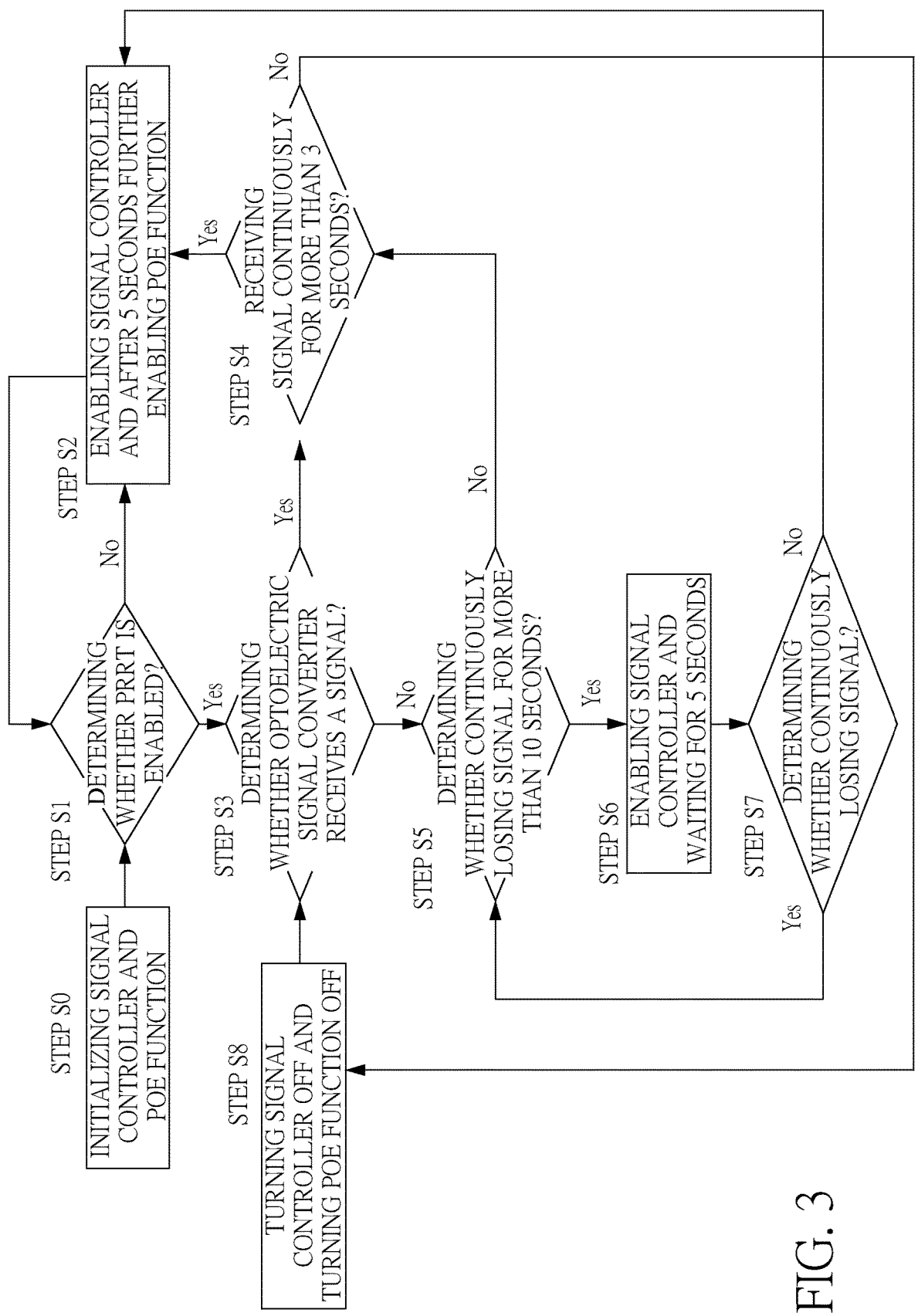
FIG. 3 is a flow chart of a method used for remote control by optical fiber signals and power over Ethernet of the present invention.

With reference to FIG. 3, when the PRRT is enabled, the method used for remote control by optical fiber signals and power over Ethernet of the present invention includes the following steps:

step S0: initializing the signal controller 2 and a Power over Ethernet (PoE) function, and going to step S1 step S1: determining whether a PD remote reset technology (PRRT) function in the signal controller 2 is enabled; wherein if the PRRT is disabled, going to step S2, and if the PRRT is enabled, going to step S3;

step S2: enabling the signal controller 2, and after 5 seconds passes, further enabling the PoE function, and going to step S1;

step S3: determining whether the optoelectric signal converter 11 receives a signal; wherein if the optoelectric signal converter 11 receives the signal, going to step S4, and if the optoelectric signal converter 11 does not receive the signal, going to step S5; wherein the optoelectric signal converter 11 receives the optical signal from the Ethernet Switch 70 via the optical fiber 12;

step S4: determining whether the optoelectric signal converter 11 has received the signal continuously for 3 seconds; wherein if the optoelectric signal converter 11 has received the signal continuously for 3 seconds, going to step S2, and if the optoelectric signal converter 11 has received the signal only sporadically for 3 seconds, going to step S8;

step S5: determining whether the optoelectric signal converter 11 has lost the signal continuously for 10 seconds; wherein if the optoelectric signal converter 11 has lost the signal continuously for 10 seconds, going to step S6, and if the optoelectric signal converter 11 has lost the signal only sporadically for longer than 10 seconds, going to step S4;

step S6: enabling the signal controller 2, and after 5 seconds passes, going to step S7;

step S7: determining whether the optoelectric signal converter 11 loses the signal continuously; wherein if the optoelectric signal converter 11 loses the signal continuously, going to step S5, and if the optoelectric signal converter 11 loses the signal only sporadically, going to step S2;

step S8: turning the signal controller 2 off and turning the PoE function off, and going to step S3.

Regarding the steps mentioned above, the following can be concluded:

step S0 to step S1 can be viewed as initializing;

step S1 to step S2 can be viewed as working normally without PRRT;

step S1 to step S3 to step S4 to step S2 as a cycle can be viewed as working normally with PRRT;

step S5 to step S6 to step S7 as a cycle can be viewed as standing by for restoration of an optical communication after shut down of the remote network equipment;

step S3 to step S5 to step S4 to step S8 as a cycle can be viewed as shutting down the remote network equipment.

As an example, when the device used for remote control by optical fiber signals and power over Ethernet 1 of the present invention is working normally, the above steps will be in the cycle of step S1 to step S3 to step S4 to step S2 as working normally with PRRT. If the optical fiber 12 is to be disconnected from the optical fiber port 71, once the optical communication is disrupted, the above steps will be in the cycle of step S3 to step S5 to step S4 to step S8 as shutting down the remote network equipment. The remote network equipment in step S8 would power off and shut down, and after 10 seconds passes, the above steps will be in the cycle of step S5 to step S6 to step S7 as standing by for restoration of the optical communication after shut down of the remote network equipment. The remote network equipment powered off and shut down after step S8 will wait for a re-connection of the optical fiber 12 in the optical fiber port 71. Once the optical communication is restored, the above steps will be in the cycle of step S1 to step S3 to step S4 to step S2 as working normally with PRRT again, thus the remote network equipment in step S2 would be re-supplied with power over the Ethernet.

Note that after step S8 the remote network equipment would power off, and then in step S2 the remote network equipment would be supplied with power over the Ethernet by the PSE, therefore the remote network equipment in step S2 would be re-supplied with power after powering off; in other words, the remote network equipment would be restarted.

In conclusion, the method and the device used for remote control by optical fiber signals and power over Ethernet of the present invention basically acts like a relay between the Ethernet Switch and the remote network equipment, making the connection between the Ethernet Switch and the remote network equipment possible, and satisfying both needs of power supplying and data transmission. In addition, by unplugging the optical fiber 12 from the Ethernet Switch and re-plugging the optical fiber back, the remote network equipment can be controlled for restarting without requiring any working personnel to arrive at the location of the remote network equipment. As a result, the present invention improves an efficiency of restarting the remote network equipment.

What is claimed is:

1. A device used for remote control by optical fiber signals and Power over Ethernet, the device comprising:
   a power sourcing equipment (PSE), outputting a direct current (DC) via at least one network cable to at least one powered device (PD), wherein when the PSE receives a second restarting signal, the PSE restarts and stops supplying power to the at least one PD;
   a network packet switching controller, transferring and receiving a network packet via the at least one network cable to the at least one PD, wherein when the network packet switching controller receives a first restarting signal, the network packet switching controller restarts;
   an optoelectric signal converter, receiving an optical signal from an optical fiber, converting the optical signal into a digital signal, and outputting the digital signal;
   a signal controller, electrically connecting to the PSE and outputting the second restarting signal to the PSE; wherein the signal controller electrically connects the network packet switching controller and outputs the first restarting signal to the network packet switching controller, and the signal controller also electrically connects the optoelectric signal converter and determines whether the optical signal has been interrupted based on the digital signal converted by the optoelectric signal converter; wherein:
   when the signal controller determines that the optical signal has been interrupted for a first time duration, the signal controller outputs the first restarting signal and the second restarting signal for restarting both the network packet switching controller and the PSE, and for stopping the PSE from supplying power to the at least one PD; and
   after restarting, the signal controller resumes power supplying to the at least one PD;
   the first time duration is greater than 3 seconds.

2. The device as claimed in claim 1, further comprising:
   a port physical layer, including multiple outputting differential signaling ports and multiple inputting differential signaling ports.

3. The device as claimed in claim 2, further comprising:
   multiple isolating coil sets, wherein each of the isolating coil sets has a first side and a second side; wherein the first side of each of the isolating coil sets is electrically connected to a specifically corresponding outputting differential signaling port among the multiple outputting differential signaling ports and a specifically corresponding inputting differential signaling port among the multiple inputting differential signaling ports; and
   multiple connectors, wherein each of the connectors is electrically connected to a specifically corresponding outputting differential signaling port and a specifically corresponding inputting differential signaling port from the isolating coil sets on the second side.

4. The device as claimed in claim 1, wherein the optical fiber connecting the optoelectric signal converter is connected to an Ethernet Switch; wherein the Ethernet Switch outputs the optical signal to the optoelectric signal converter via the optical fiber, and the Ethernet Switch has an optical fiber port; wherein
   when the optical fiber is plugged into the optical fiber port, the optoelectric signal converter receives the optical signal from the Ethernet Switch, and when the optical fiber is un-plugged from the optical fiber port, the optoelectric signal converter stops receiving the optical signal from the Ethernet Switch.

5. The device as claimed in claim 1, further comprising:
   a configuration switch, outputting multiple settings, and electrically connecting the signal controller; wherein the settings are configured through the configuration switch.

6. The device as claimed in claim 1, wherein the device is connected to a remote network equipment and supplies power to the remote network equipment; wherein
   the device is also connected to an Ethernet Switch via the optical fiber;
   when the network equipment requires a restart, the optical fiber is unplugged from the Ethernet Switch and the optical fiber is further re-plugged into the Ethernet Switch after the first time duration, for restarting the network equipment; wherein
   the first time duration is greater than 3 seconds.

7. A method for remote control by optical fiber signals and Power over Ethernet for a power sourcing equipment (PSE) outputting a direct current (DC) via at least one network cable to at least one powered device (PD), for an optoelectric signal converter receiving an optical signal from an optical fiber, and for a signal controller outputting a second restarting signal to the PSE, outputting a first restarting signal to a network packet switching controller, and determining whether the optical signal has been interrupted based on a digital signal converted by the optoelectric signal converter and entered into the signal controller; wherein
   the method further comprising the following steps:
   step S0: initializing the signal controller and a Power over Ethernet (PoE) function, and going to step S1;
   step S1: determining whether a PD remote reset technology (PRRT) function in the signal controller is enabled; wherein if the PRRT is disabled, going to step S2, and if the PRRT is enabled, going to step S3;
   step S2: enabling the signal controller, and after a first time duration passes, further enabling the PoE function, and going to step S1;
   step S3: determining whether the optoelectric signal converter receives a signal; wherein if the optoelectric signal converter has received the signal, going to step S4, and if the optoelectric signal converter does not receive the signal, going to step S5; wherein the optoelectric signal converter receives the optical signal from an Ethernet Switch via the optical fiber;
   step S4: determining whether the optoelectric signal converter has continuously received the signal for a second time duration; wherein if the optoelectric signal converter has received the signal continuously for the second time duration, going to step S2, and if the optoelectric signal converter has received the signal only sporadically for more than the second time duration, going to step S8;

step S5: determining whether the optoelectric signal converter has continuously lost the signal for a third time duration; wherein if the optoelectric signal converter has lost the signal continuously for the third time duration, going to step S6, and if the optoelectric signal converter has lost the signal only sporadically for the third time duration, going to step S4;

step S6: enabling the signal controller, and after a fourth time duration passes, going to step S7;

step S7: determining whether the optoelectric signal converter continues to lose the signal; wherein if the optoelectric signal converter loses the signal continuously, going to step S5, and if the optoelectric signal converter loses the signal only sporadically, going to step S2; and step S8: turning the signal controller off and turning the PoE function off, and going to step S3.

8. The method as claimed in claim 7, wherein the first time duration is greater than 5 seconds, the second time duration is greater than 3 seconds, the third time duration is greater than 10 seconds, and the fourth time duration is greater than 5 seconds.

\* \* \* \* \*